United States Patent [19]
Aly et al.

[11] 3,822,478
[45] July 9, 1974

[54] WHEEL CENTERING DEVICE

[76] Inventors: Kenneth M. Aly, 433 1st Ave.; Alton S. Kjorlien, Rt. 2, Box 110, both of Perham, Minn.

[22] Filed: Oct. 12, 1972

[21] Appl. No.: 296,836

[52] U.S. Cl.............. 33/193, 33/203, 33/203.18, 33/286, 33/172 D, 33/174 Q, 33/337
[51] Int. Cl...................... G01b 5/25, G01b 5/255
[58] Field of Search.... 33/193, 203, 203.11–203.19, 33/286, 336, 337, 172 O, 174 Q; 301/13 R, 13 SM

[56] References Cited
UNITED STATES PATENTS
2,566,407   9/1951   Evans.................................. 33/203
2,582,427   1/1952   Greenleaf........................ 33/203.18

*Primary Examiner*—Samuel B. Rothberg
*Assistant Examiner*—Willis Little
*Attorney, Agent, or Firm*—Merchant, Gould, Smith & Edell

[57] ABSTRACT

A device for centering one wheel rim with respect to another in dual wheel arrangements for automotive vehicles. A mounting structure, having means for application to a wheel rim, supports a centering rod having an inner end receivable in an axially opening central recess in a vehicle wheel construction. The centering rod is universally pivotally movable relative to the mounting structure, and has an indicator which cooperates with a portion of the mounting structure to provide a visual indication as to the state of axial alignment or misalignment of the wheel rims of the dual wheel.

10 Claims, 5 Drawing Figures

FIG. 1
FIG. 2
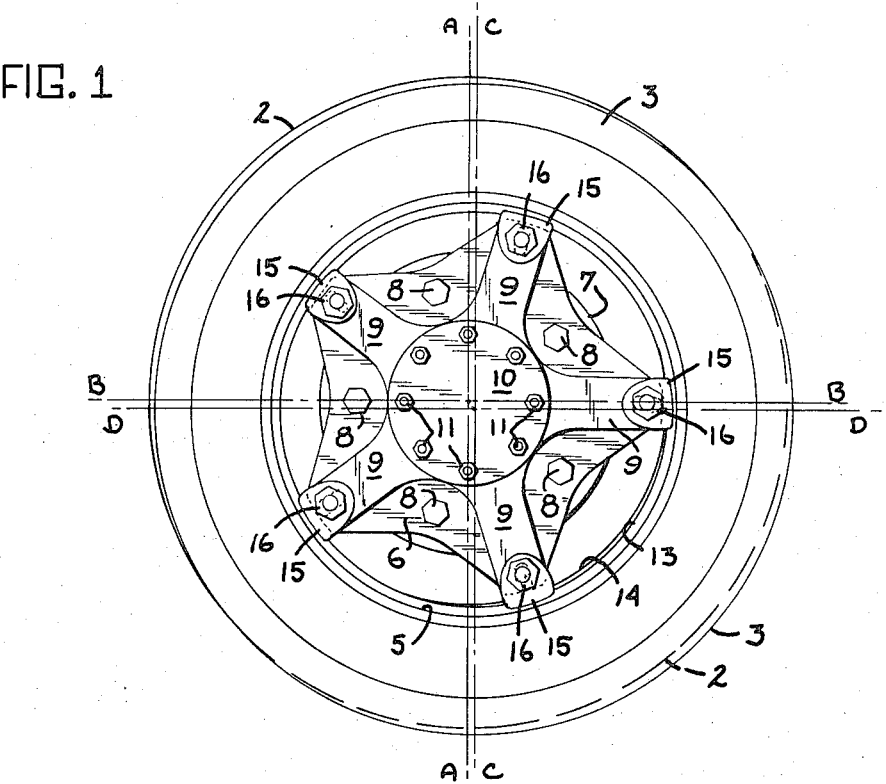
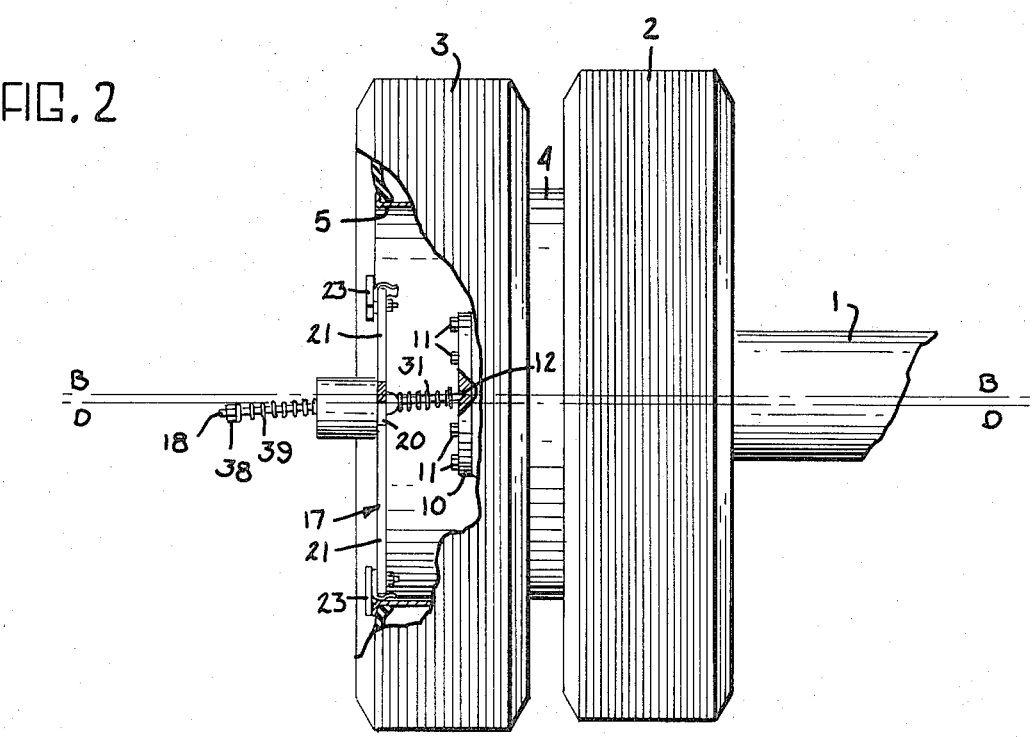

3,822,478

WHEEL CENTERING DEVICE

BACKGROUND OF THE INVENTION

Heretofore, in attaching a second wheel element or rim to a first wheel element of a dual wheel structure, the second wheel element was attached by means of the visual clamping devices, after which the wheel structure was rotated, usually manually, to enable the operator to distinguish visually whether or not the two wheel elements were truly axially aligned. If the elements were misaligned, the clamps were loosened and the second wheel element adjusted, the clamps re-tightened, and the wheel structure again rotated. This action was repeated until the wheel elements were as close to being axially aligned as the operator could determine by visual inspection, and was a tedious and unsatisfactory procedure.

SUMMARY OF THE INVENTION

An important object of this invention is the provision of a simple and inexpensive device which may be quickly and easily applied to a wheel rim and by means of which the wheel rim may be quickly axially aligned with the wheel to which it is to be attached, and with a high degree of accuracy.

To these ends, the present invention is in the nature of a mounting structure having portions adapted to fit a tire-equipped wheel rim which is to be secured to a vehicle wheel to provide a dual wheel arrangement. A centering rod is mounted in a central opening in the mounting structure, the opening being coaxial with the wheel rim to be mounted. The centering rod is capable of universal swinging movements in the opening, and has an inner end tapered or pointed for reception in a central recess usually found in a portion of the vehicle wheel, the same being a center drill hole utilized in machining the wheel during manufacture thereof. The centering rod projects outwardly beyond the mounting structure and has mounted thereon the outer end of an indicator member for limited universal swinging and axial sliding movements. The indicator member has an inner end that is slidable on a generally flat smooth outer surface of the mounting structure, this surface having markings that are positioned to cooperate with the inner end of the indicator member to show the state of axial alignment or misalignment between the vehicle wheel and the rim being mounted on the wheel.

DESCRIPTION OF THE DRAWINGS

FIG. 1 is a view in end elevation of a conventional tire-equipped dual wheel structure;

FIG. 2 is a view in side elevation of the structure of FIG. 1, some parts being broken away, and the wheel centering device of this invention being applied to the outer wheel rim;

DETAILED DESCRIPTION OF THE PREFERRED EMBODIMENT

Figure 3:
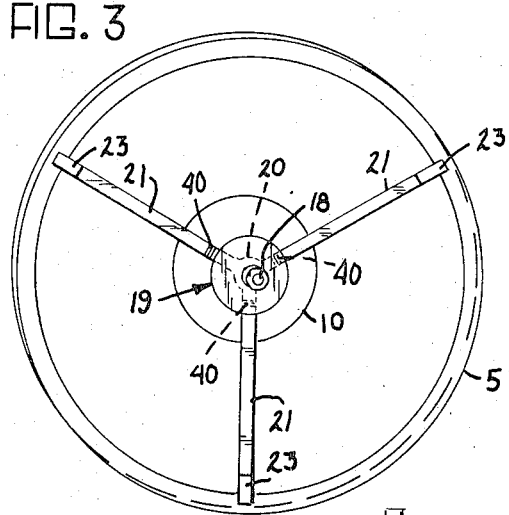
FIG. 3 is a view in end elevation, as seen from the left to the right with respect to FIG. 2, some parts being removed.
Figure 4:
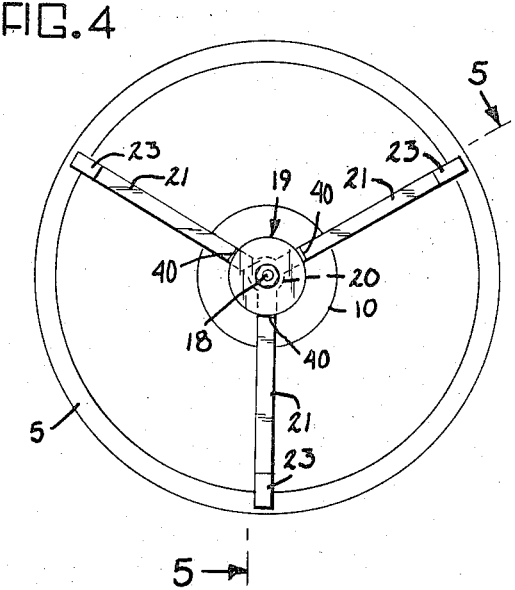
FIG. 4 is a view corresponding to FIG. 3, but showing the centering device of this invention indicating correct alignment of the portions of a dual wheel.

In FIGS. 1 and 2, a conventional dual wheel and axle construction is fragmentarily shown, an axle housing being indicated at 1, and interior and exterior pneumatic tires indicated at 2 and 3 respectively, these being mounted on respective wheel rims 4 and 5. The wheel rim 4 is welded or otherwise mounted on a conventional wheel disk 6 that is rigidly secured to a brake drum or other portion of the axle housing, indicated at 7, by circumferentially spaced machine screws or the like 8. The wheel disk 6 is formed to provide a plurality of circumferentially spaced radial arm portions 9, and has secured thereto a central cover plate 10 by means of machine screws 11. The cover plate 10 is provided with a central axially outwardly opening recess 12, the recess being made by a conventional center drill or punch during manufacture of the wheel structure, and is disposed on the axis of the wheel disk 6 and its rim portion 4. In the usual dual wheel construction, the outer wheel rim 5 is formed to provide a radially inwardly projecting annular clamping flange 13 that is disposed to abuttingly engage a similar flange 14 that projects radially inwardly from the inner rim 4. The outer rim 5 is clamped in place by a plurality of clamping elements 15 mounted on clamping nut-equipped studs 16 that project outwardly from the outer ends of the arm portions 9.

The structure thus far described is convention and well known and, in and of itself, does not comprise the instant invention. Hence, further detailed showing and description thereof is omitted, in the interest of brevity. It should suffice to state that the axially outer rim 5 is adjustable in radial directions with respect to the inner rim 4 and disk 6 so that compensation may be made for manufacturing tolerance variations. As above stated, adjusting the outer rim 5 with respect to the inner wheel rim 4, so that the axes thereof are accurately aligned, has been a problem, requiring experimental locating of the outer wheel and adjustment until accurate alignment is obtained.

The wheel centering device of this invention involves a mounting structure, indicated generally at 17, a centering rod 18, and indicating means including a body member 19 mounted on the centering rod 18. The mounting structure 17 comprises a central hub 20, a plurality of circumferentially spaced spokes 21 extending radially outwardly from the hub 20, rim engaging fingers 22, and stop lugs 23. The fingers 22 are preferably made from relatively stiff spring steel or the like, and each thereof overlies the outer end of a different one of the spokes 21 to engage the radially inner surface of the rim 5. Each of the stop lugs 23 is mounted together with an adjacent one of the fingers 22 to the outer end of a different one of the spokes 21, by means of nut-equipped screws or the like 24, each stop lug 23 engaging the axially outer rim flange of the rim 5 to limit axially inward movement of the mounting structure 17 with respect to the rim 5. The hub 20 is provided with a central opening 25 therethrough through which the centering rod 18 loosely extends. The fingers 22 are equally spaced radially from the central opening 25, and are so arranged that, when the mounting structure 17 is applied to the wheel rim 5, that the central opening 25 is accurately disposed on the axis of the wheel rim 5.

Figure 5:
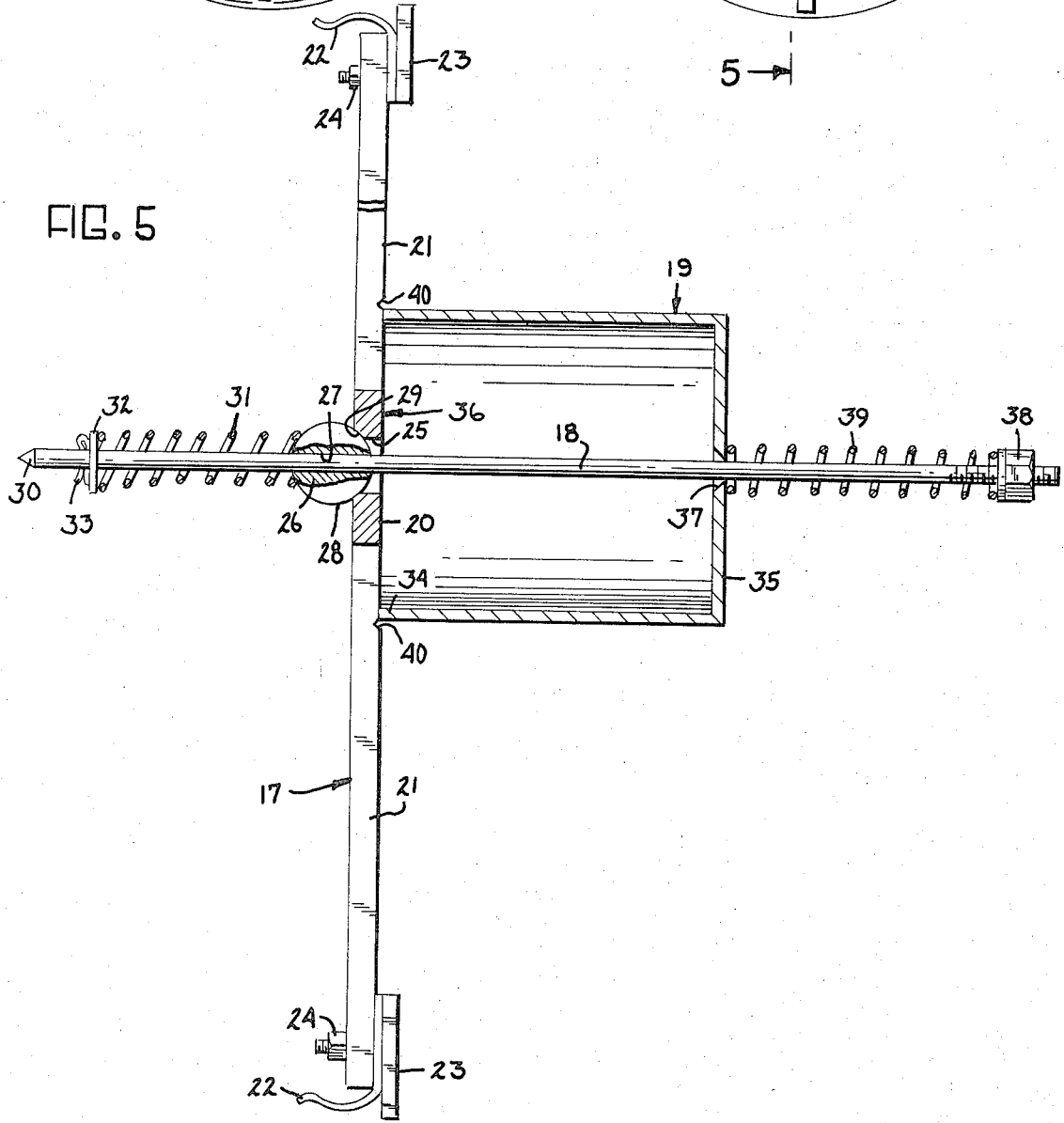
FIG. 5 is an enlarged axial section of the centering device, taken on the line 5—5 of FIG. 4, some parts being broken away and some parts being omitted.

The centering rod 18 is supported in the central opening 25 by a bearing element 26 having an axial bore 27 therethrough through which the centering rod 18 slidably projects. The bearing element 26 is provided with a spherical outer surface 28, the central opening 25 being countersunk or chamfered, as indicated at 29, to provide a bearing seat for the bearing element 26, see particularly FIG. 5. The bearing element 26 not only permits the centering rod 18 to move axially through the central opening 25, but also to partake of universal swinging movements with respect to the mounting structure 17. At its inner end, the centering rod 18 is formed to provide a pointed or tapered portion 30 that is receivable in the center recess 12 of the wheel structure when the mounting structure 17 is applied to the rim 5 and the rim 5 applied to the rim 4 for mounting thereon. A coil compression spring 31 encompasses the centering rod 18 between the bearing element 26 and a stop washer 32 positioned on the centering rod 18 in inwardly spaced relation to the tapered portion 30 thereof. A cotter pin or the like 33 limits axial movement of the stop washer 32 in one direction, whereby the spring 31 yieldingly urges the bearing element 26 into seating engagement with the hub 20.

The indicating means body member 19, in the embodiment of the invention illustrated, is in the nature of a hollow cylinder having an inner open end 34 and an opposite transverse end 35, the inner open end 34 slidably engaging a smooth flat outer surface 36 of the hub 20 and spokes 21. The outer end wall 35 of the body member 19 is provided with a central opening 37 that is countersunk or otherwise formed to slidably receive the outer portion of the centering rod 18 in outwardly spaced relation to the mounting structure 17 and permit limited universal pivotal movements of the centering rod 18 relative to the body member 19. The outer end of the centering rod 18 is screw-threaded to receive a washer-equipped nut 38 between which end the end wall 35 of the body member 19 a coil compression spring 39 is interposed, the spring 39 encompassing the centering rod 18, see FIG. 5, to yieldingly urge the body member 19 into sliding engagement with the outer surface 36 of the hub 20 and spokes 21. The outer surfaces 36 of the spokes 21 are provided with marks or indicia in the nature of grooves 40 that are equidistantly radially outwardly spaced from the axis of the central opening 25 in the hub 20, and are so spaced that, when the centering rod 18 is disposed at right angles to the plane of the flat surface 36, each of the grooves or marks 40 will be visible to the operator just outwardly of the inner end 34 of the body member 19. By tilting the centering rod 18 away from its right angular disposition with respect to the plane of the surface 36, one or more of the marks 40 will be covered by the cylindrical body member 19, which indicates that the centering rod 18 is displaced from a right angular relationship to the surface or surfaces 36.

When it is desired to mount the tire 3 and its rim 5 on the rim 4 and wheel disk 6, the clamping elements 15 are removed and the tire-equipped rim 5 placed against the rim 4. The clamping elements 15 are then replaced and clamping nuts screw-threaded on the studs 16, leaving the clamping elements 15 sufficiently loose to permit movement of the rim 5 in directions radially with respect to the rim 4. The mounting structure 17, together with the parts mounted thereon, is then applied to the axially outer portion of the rim 5, and the pointed or tapered end 30 of the centering rod 18 is moved into the axial center recess 12. It will be noted, at this point, that the adjustment nut 38 is so placed on the centering rod 18 that, when the stop lugs 23 are in contact with the outer flange of the rim 5, the tapered or pointed portion 30 of the centering rod 18 is yieldingly urged into the center recess 12. FIGS. 1–3 illustrate a misalignment between the two wheel portions or rims 4 and 5, the center lines A—A and B—B being those of the wheel rim 4, and the lines C—C and D—D being the center lines of the rim 5. Such misalignment of the rims 4 and 5 causes the centering rod 18 to be disposed in angularly displaced relationship to a right angular position with respect to the outer surfaces 36, carrying the body member 19 to a laterally displaced position wherein one or more of the marks 40 on the spokes 21 are hidden thereunder, as shown in FIGS. 2 and 3. In order to correct the misalignment, the outer rim 5 and its tire 3 are moved, in this instance upwardly and to the left with respect to FIGS. 1 and 3, causing the centering rod 18 to swing relative to the center recess 12 and to the axis of the bearing element 26, carrying with it the body member 19 until the body member 19 becomes centered between all of the marks 40. When all of the marks 40 are visible about the open inner end 34 of the body member 19, the wheel portions or rims 4 and 5 are truly axially aligned. The nuts are then tightened on the clamping studs 16 to secure the rim 5, with its tire 3, in accurately axially aligned relationship with the rim 4 and its tire 2. This done, the device is slipped axially out of engagement with the rim 5 and the vehicle is ready to move.

While we have shown and described a commercial embodiment of our wheel centering device, it will be appreciated that the same is capable of various modification without departure from the spirit and scope of the invention as defined in the claims.

What is claimed is:

1. A wheel centering device comprising:
    a. a mounting structure having a central transverse opening therethrough and circumferentially spaced radially outer portions for engagement with a wheel rim to be mounted on a vehicle wheel means;
    b. an elongated centering rod extending loosely through said central opening and having an inner end adapted to be centrally received in an axially opening center recess in the vehicle wheel means;
    c. bearing means mounting said centering rod for axial and universal swinging movements in said central opening;
    d. and cooperating relatively stationary and relatively movable eccentricity indicating means on said mounting structure and centering rod respectively, said movable means being mounted on said centering rod in longitudinally outwardly spaced relation to said bearing means for swinging movements with said centering rod, said indicating means providing visual indication of axial alignment or axially offset relationship between said wheel means and said wheel rim when the rim is mounted on said wheel means.

2. The wheel centering device defined in claim 1 in which said bearing means comprises a bearing element having an axial bore therethrough for axial sliding reception of said centering rod, said bearing having a spherical outer surface portion partially received in said opening for universal rotary movements relative to said mounting structure.

3. The wheel centering device defined in claim 2, in further combination with yielding means on said centering rod urging said bearing element toward engagement with said mounting structure.

4. The wheel centering device defined in claim 3 in which said mounting structure defines an outer flat surface portion adjacent said central opening and disposed in a plane at right angles to the axis of said central opening, said relatively stationary indicating means comprising a plurality of marks on said flat surface portion circumferentially spaced about the axis of the central opening and in equidistantly radially outwardly spaced relation to said axis, said movable indicating means comprising a body member extending longitudinally of said centering rod and having an annular inner end slidably engaging said flat surface portion and an outer end defining an opening axially slidably receiving said centering rod, said body member being disposed on said centering rod for limited universal swinging movements relative thereto.

5. The wheel centering device defined in claim 4, in further combination with second yielding means on said centering rod urging said body member toward said sliding engagement with said flat surface portion.

6. The wheel centering device defined in claim 1 in which said mounting structure includes a flat surface portion disposed in a plane at right angles to the axis of said central opening, said radially outer portions including guide elements for engagement with radially inner portions of the wheel rim and stop portions for engagement with a side of the wheel rim, whereby to dispose said flat surface portion in a plane normal to the axis of the wheel rim and said central opening coaxial with the wheel rim, when the mounting structure is applied to the wheel rim.

7. The wheel centering device defined in claim 1 in which said mounting structure comprises a central hub portion and a plurality of spokes extending radially outwardly therefrom, the radially outer ends of said spokes providing said wheel rim engaging outer portions, said central opening extending axially through said hub portion.

8. The wheel centering device defined in claim 7 in which said mounting structure defines a flat surface portion disposed in a plane at right angles to the axis of said central opening, said realtively stationary indicating means comprising at least one indicia marking on said flat surface portion, said relatively movable means having a portion slidably engaging said surface portion and movable toward and away from said indicia marking responsive to movement of the wheel rim axis relative to the wheel means axis.

9. The wheel centering device defined in claim 8 in which said relatively movable means comprises a body member extending generally longitudinally of said centering rod axially outwardly of said hub, said body member having an axially inner portion engaging said surface area in laterally spaced relation to said central opening, said body member including an outer transverse portion having an opening therethrough for axial sliding reception of said centering rod and for limited relative universal swinging movement between said body member and centering rod.

10. The wheel centering device defined in claim 9, in further combination with yielding means on said centering rod urging said body member toward sliding engagement with said surface area of the mounting means.

* * * * *